United States Patent Office 3,590,095
Patented June 29, 1971

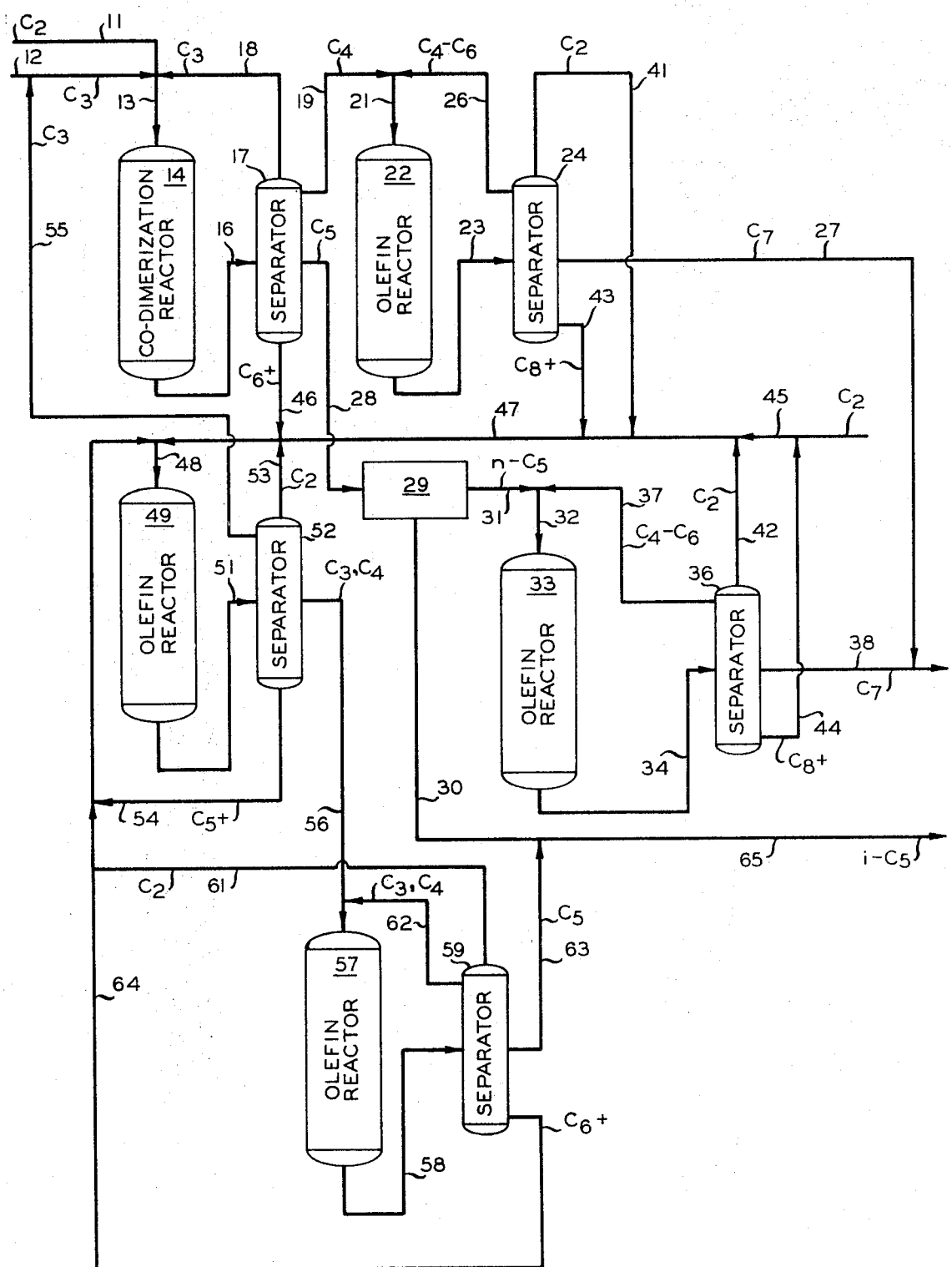

3,590,095
CONVERSION OF ETHYLENE-PROPYLENE FEED TO ISOAMYLENES AND LINEAR OLEFINS
Ernest A. Zuech, Bartlesville, Okla., assignor to Phillips Petroleum Company
Filed Apr. 18, 1968, Ser. No. 722,261
Int. Cl. C07c 3/62
U.S. Cl. 260—683
7 Claims

ABSTRACT OF THE DISCLOSURE

Ethylene and propylene are co-dimerized to produce linear butenes and pentenes and branched amylenes and hexenes, the linear butenes and pentenes are converted by the olefin reaction to longer chain linear olefins, the $C_6$ and heavier olefins are converted by the olefin reaction to produce intermediate length branched chain olefins which are further reacted in an olefin reaction zone to produce additional isoamylene. In one aspect, the co-dimerization is carried out in the presence of a homogeneous transition metal-containing catalyst system.

This invention relates to producing isoamylenes and linear olefins from ethylene or a mixture of ethylene and propylene. In one aspect, the invention relates to producing linear heptenes and isomylenes from ethylene. In another aspect the invention relates to producing isoamylenes and linear heptenes from a mixture of ethylene and propylene.

In many instances it desirable to convert an olefin to produce another, more valuable, olefin. For example, it is desirable to produce isoamylene, a valuable intermediate for the production of isoprene, from a relatively inexpensive and readily available feed stock, such as ethylene or a mixture of ethylene and propylene. It is also desirable in some instances to produce long chain linear olefins from a relatively inexpensive and readily available shorter chain olefin, such as ethylene or a mixture of ethylene and propylene. Isoamylenes are important branched olefins in that they can conveniently be dehydrogenated to isoprene. Linear olefins, such as linear heptenes, for example, are useful materials in that they can be converted, via the oxo process, to alcohols, for example, octanols, which are useful in the preparation of plasticizers. Also, linear olefins in the 10–16 carbon range are valuable for the preparation of biodegradable detergents. The present invention provides a novel process for the production of such branched olefins and linear olefin intermediates using, as a feed stream, ethylene or a combination of ethylene and propylene.

An object of this invention is to produce isoamylenes and long chain linear olefin hydrocarbons by the conversion of ethylene or ethylene and propylene. Another object of the invention is to produce isoamylenes and long chain linear olefins from ethylene or ethylene and propylene.

Other aspects, objects and the advantages of the invention are apparent in the written description, the drawing, and the claims.

According to the invention, a mixture of ethylene and propylene is dimerized using a catalyst system which has activity for the co-dimerization of ethylene and propylene to products which contain substantial amounts of linear butenes and pentenes as well as branched dimers including, for example, isoamylenes and branched hexenes. The linear products are converted according to the olefin reaction to produce longer chain linear olefins while the branched chain products are separated and further converted to produce a desired branched olefin. The invention is particularly applicable to the production of isoamylenes and linear olefins having at least 7 carbon atoms per molecule. Further according to the invention, a homogeneous transition metal containing catalyst system is used for the co-dimerization.

In the co-dimerization step, the catalyst system is selected from any one of a large number of catalyst systems which have activity for the co-dimerization of ethylene and propylene to products which contain substantial amounts of linear butenes and pentenes. Such catalyst systems can be heterogeneous or homogeneous. The homogeneous systems generally consist of an organic solvent-soluble compound or complex of a transition metal, frequently a complex of nickel, cobalt or chromium, in admixture with a suitable organometallic adjuvant, most often an organoaluminum compound.

The operating conditions for the co-dimerization unit depend primarliy on the specific catalyst selected. In general, however, using homogeneous transition metal containing systems, the co-dimerization takes place at —50 to 225° F., at any convenient pressure including atmospheric, at reaction times varying from 0.1 minute to 20 hours, in the liquid phase, preferably in the presence of a diluent such as a paraffinic or aromatic solvent and their halogenated derivatives. Some examples of suitable homogeneous catalysts are:

bis(triphenylphosphine)dichloronickel/ethylaluminum dichloride (EADC)
bis(tributylphosphine)dichloronickel/EADC
bis(triphenylphosphine)allylnickel chloride/EADC
bis(triphenylphosphine) methylnickel chloride/EADC
bis(pyridine)dichloronickel/EADC
tris(triethylenediamine)tetrachlorodinickel/EADC
bis(triphenylphosphine oxide)dichloronickel/diethylaluminum chloride (DEAC)
bis(triphenylarsine oxide)dibromonickel/methylaluminum sesquichloride (MASC)
bis(3-picoline)dichloronickel/DEAC
bis(4-picoline)dichloronickel/EADC
bis(4-ethylpyridine)dichloronickel/DEAC
tris(2,4-pentanedionato)cobalt/MASC
bis(tributylphosphine)dichlorocobalt/DEAC
tris(pyridine)trichlorochromium/EADC
bis(tributylphosphine)trichlorochromium/EADC
tris(4-ethylpyridine)trichlorochromium/EADC
bis(4-ethylpyridine)dichlorochromium/EADC
bis(4-ethylpyridine)dinitrosyldichlorochromium/EADC
bis(triphenylphosphine oxide)dinitrosyldichlorochromium/EADC
bis($\pi$-allyl)iodocobalt/DEAC
triphenylphosphine($\pi$-allyl)iodonickel/EADC and the like. The mole ratio of organometallic adjuvant to the transition metal complex will generally be from about 1:1 to about 20:1.

Although transition metal-containing homogeneous catalyst systems are presently preferred, other catalyst systems, including heterogeneous catalysts, which are active for the co-dimerization of ethylene and propylene to a suitable mixture of both linear and branched products, can also be used. For example, catalysts such as alkali metals, alkali-metal-containing alloys, and organoalkali metal compounds such as phenylpotassium and the like can be used. Such alkali metal-containing materials can be associated with graphite, charcoal, silica, alumina, kieselguhr, metal carbonates, and other inert carriers.

Such alkali metal-containing catalyst systems are known and the conditions for their use are conventional in the art. The co-dimerization is generally carried out at temperatures of 100–600° F., at preferably superatmospheric pressures of up to about 2000 p.s.i.g., in the presence or absence of an inert diluent, and for reaction times periods of 0.1 minute to 20 hours.

The term "olefin reaction," as used herein, is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated compounds, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or in different molecules.

The olefin reaction, as used in the present invention, is illustrated by the following reactions:

(1) The disproportionation of an acyclic mono- or polyene having at least 3 carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having 3 or more carbon atoms and a different acyclic mono- or polyene having 3 or more carbon atoms to produce different acyclic olefins; for example, the conversion of butene-2 and isobutylene yields propylene and isopentene; and (3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 yields propylene and 2-methylbutene-1.

The catalysts which are applicable in the present invention include all of those which have activity for the disproportionation of propylene to ethylene and butene. Some examples of such catalysts are:

(1) Silica or thoria promoted by an oxide or a compound convertible to the oxide by calcination of tungsten, molybdenum, rhenium, vanadium, niobium, tellurium, or tantalum or by a sulfide of tungsten or molybdenum;

(2) Alumina promoted by an oxide or compound convertible to an oxide by calcination of molybdenum, tungsten, or rhenium; by a sulfide of tungsten or molybdenum; or by an alkali metal salt, ammonium salt, alkaline earth metal salt, or bismuth salt of phosphomolybdic acid;

(3) One or more of the group zirconia, aluminum phosphate, zirconium phosphate, calcium phosphate, magnesium phosphate, or titanium phosphate promoted by one or more of a sulfide of molybdenum or tungsten, or by an oxide or a compound convertible to an oxide by calcination of molybdenum, tungsten, vanadium, niobium, tantalum or rhenium or by magnesium tungstate or beryllium phosphotungstate;

(4) Silica, alumina, zirconia, aluminum phosphate, zirconium phosphate, calcium phosphate, magnesium phosphate, or titanium phosphate promoted by a hexacarbonyl of molybedenum or tungsten; and (5) Homogeneous olefin reaction catalysts where appropriate. In such embodiments, catalyst removal and/or recovery steps normally are required. For example, transition metal-containing homogeneous catalyst systems, active for the disproportionation of olefins, can be used. An example of one such catalyst system is bis(triphenylphosphine)dinitrosyldichloromolybdenum and methylaluminum sesquichloride which can be used at atmospheric pressure, room temperature, and preferably in the presence of a reaction diluent. Some suitable homogeneous catalyst systems are disclosed and claimed in U.S. Serial Nos. 635,649 (now abandoned), 635,657 (now abandoned), 635,669 (now abandoned), 635,693 (now abandoned), 635,708, filed May 3, 1967; 694,872 (now abandoned), 694,873 (now abandoned), 694,874, filed Jan. 2, 1968; and 696,109 (now abandoned), filed Jan. 8, 1968.

The catalysts of (1) can be prepared and activated by conventional techniques such as by combining a catalyst grade silica with a suitable tungsten, molybdenum, rhenium, vanadium, niobium, tellurium, or tantalum compound by a conventional method such as, for example, impregnation, dry mixing or coprecipitation. Suitable tungsten and molybdenum compounds include tungsten oxide and molybdenum oxide and compounds convertible to the oxide, tungsten sulfide and molybdenum sulfide. The supported oxides and compounds convertible to the oxide are activated by calcining in air, and the supported sulfides are activated by heating in an inert atmosphere.

The catalysts of (2) can be prepared and activated by conventional techniques such as by combining catalyst grade alumina with an oxide or compound convertible to an oxide by calcination of molybdenum, tungsten or rhenium and calcining the resulting mixture after removal of any solvent used in the impregnation. The sulfides of tungsten of molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate, followed by calcination in air to produce an activated catalyst. Alternatively, the support material, such as zirconia, can be impregnated with a compound of the promoter convertible to the oxide, such as ammonium tungstate, followed by calcination in air. In the preparation of a sulfide-containing catalyst, a sulfide of the promoter can be ball milled with a support such as zirconium phosphate, followed by heating in an inert atmosphere such as nitrogen. Magnesium tungstate and beryllium phosphotungstate can be dry mixed with titanium phosphate, for example, and activated by calcination in air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalyst compositions of (5) can be prepared by simple combination of the transition metal compound with a suitable adjuvant such as, for example, an organoaluminum halide, under conditions suitable to provide a catalyst active for the olefin reaction.

The solid catalytic agent is considered to be the reaction product resulting from the admixture of the support material and the promoter material and any subsequent activation treatment.

The operating temperature for the olefin reaction is generally in the range of about 0 to 1200° F. When using the catalysts of (1) it is in the range of about 400 to 1100° F.; when using the catalysts of (2), in the range of about 150 to 500° F.; when using the catalysts of (3), in the range of about 600 to 1200° F.; when using the catalysts of (4), in the range of about 0 to 600° F.; when using the catalysts of (5), in the range of about −20 to 170° F. In the olefin reaction process, generally the pressure is not critical except with respect to the state of the materials in the reaction zone and with respect to conditions up and downstream from the reaction zone, but generally the pressure is in the range of 0 to 2000 p.s.i.g.

The solid catalysts of the olefin reaction can be in the form of a powder, or granules, as well as in other shapes such as agglomerates, pellets, spheres, extrudates, beads, and other forms depending upon the type of contacting technique utilized.

With a fixed bed reactor and continuous operation, weight hourly space velocity in the range of about 0.5 to 1000 parts by weight of hydrocarbon feed per part by weight of catalyst per hour (WHSV) are suitable, and excellent results have been obtained in the range of 1 to 200 WHSV.

It is frequently advantageous to associate double bond isomerization with the olefin reaction. This can be done by providing a combined catalyst system which contains both an olefin reaction catalyst and a double bond isomerization catalyst. In one such system, the olefin feed sequentially contacts an isomerization catalyst and an olefin reaction catalyst. In another such system the feed contacts a compatible mixture of such catalysts. A convenient combined catalyst system of this type is a fixed bed system containing an intimate physical mixture of a particulate olefin reaction catalyst and a particulate isomerization catalyst. When air activated refractory oxide olefin reaction catalysts are used, metal oxide isomerization catalysts such as MgO, ZnO, etc., are particularly appropriate.

Depending upon the specific feed materials and the specific catalysts being used, any conventional contacting technique can be utilized, such as fixed bed reaction, fluidized bed reaction, liquid phase batch reaction, and the like.

At the completion of the reaction the reaction mixture can be processed to recover any desired product by any conventional means such as fractionation, crystallization, absorption, and the like. Unreacted material or products not in the desired molecular weight range can be recycled.

In the practice of the invention, an ethylene-propylene stream is contacted with the selected dimerization catalyst to produce linear butenes and pentenes, as well as branched olefins having a molecular weight higher than that of the starting materials, such as isoamylenes which are separated and recovered. The linear products are converted to higher molecular weight linear olefins using a plurality of olefin reaction stages with recycling of by-product ethylene and propylene to the co-dimerization unit. Branched hexenes and heavier olefins are reacted in the presence of ethylene in another olefin reaction zone to yield isoamylenes and other lower molecular weight products including isobutene which is reacted with propylene and/or n-butenes in yet another olefin reaction zone to yield additional isoamylene.

As shown in the drawing, the feed stock, together with recycle ethylene and propylene, generated in later stages, is contacted continuously with the selected catalyst system. Any convenient ratio of ethylene to propylene can be used in the feed system. Greater amounts of ethylene provide more of the linear butenes and pentenes which can be converted to the higher molecular weight linear olefins, while greater amounts of propylene favor the production of branched olefins.

The effluent from the co-dimerization reactor is then conducted to separation stages from which ethylene and propylene are recycled to the dimerization unit, isoamylenes removed by a process such as sulfuric acid extraction and recovered, branched hexenes and heavier olefins conducted to an olefin reaction zone for conversion to produce lower molecular weight branched olefins, and the linear olefins such as butenes and pentenes, are conducted to one or more olefin reaction units wherein they are contacted with olefin reaction catalysts for conversion to longer chain linear olefins. As shown in the drawing, the linear products are converted to linear heptenes, using two successive olefin reaction zones. Linear butenes are fed into one zone and a mixture of linear pentenes and hexenes fed into the second olefin reaction zone. The effluents from these zones are separated, ethylene and propylene being recycled to the dimerization zone, linear heptenes being removed as products and the linear butenes, pentenes, and hexenes being recycled to the appropriate olefin reaction zone. If desired, further reaction of the linear olefins by additional stages of the olefin reaction process can be provided to produce still heavier olefins, such as $C_{10}$–$C_{16}$ olefins.

The branched hexenes and heavier olefins produced in the dimerization zone are further reacted in an olefin reaction zone by contact, preferably with a mixture of an olefin reaction catalyst and a double bond isomerization catalyst. A preferred catalyst for the olefin reaction step is silica-supported tungsten oxide. Where a mixture of an olefin disproportionation catalyst and an isomerization catalyst are used, a preferred catalyst is a mixed bed containing silica-supported tungsten oxide intimately mixed with magnesium oxide.

The heavy olefin containing stream which is reacted in the mixed olefin reaction and isomerization catalyst zone is blended with ethylene (or propylene or ethylene-propylene mixtures) in proportions ranging from about 1 to about 20, preferably 4 to about 10, moles of ethylene per mole of heavier olefin. The ethylene used at this point can be feed ethylene and/or recycle ethylene generated in other stages. The effluent from this zone contains propylene, isobutene, and some isoamylenes, as well as unconverted reactants.

Isobutene and propylene, together with any n-butenes, from the above-described olefin reaction zone, are combined in approximately equimolar quantities and conducted to an additional olefin reaction zone containing an olefin disproportionation catalyst. The propylene can be feed olefin and/or propylene recovered from other units. The effluent from this olefin reaction zone contains a substantial amount of isoamylenes which are recovered in a subsequent separation zone. Other components of the effluent such as ethylene, propylene, isobutene, n-butenes and hexenes and heavier olefins, are recycled to the appropriate catalytic zone.

Referring to the drawing, ethylene is fed through pipe 11 and propylene through pipe 12 through pipe 13 into co-dimerization reactor 14. The effluent from reactor 14, containing normal butenes, normal pentenes, isoamylenes and branched hexenes, together with unreacted ethylene and propylene, and some olefins heavier than hexene, is passed through pipe 16 to separator 17. Propylene is removed through pipe 18 for return to reactor 14. $C_4$ olefins are removed through pipe 19 and passed through pipe 21 into a first olefin reactor 22. The effluent from reactor 22, containing a mixture of olefins, primarily linear, ranging from unreacted $C_4$ olefins up to $C_8$ and heavier olefins is passed through pipe 23 into separator 24. $C_4$ to $C_6$ olefins hare recycled to reactor 22 through pipe 26. Linear heptene is recovered through pipe 27.

$C_5$ olefins from separator 17 are passed through pipe 28 into an extraction unit 29 for separation of normal amylene and isoamylene. Isoamylene is removed through pipe 30. Normal amylene is passed through pipe 31 and pipe 32 into a second olefin reactor 33. The effluent from reactor 33, comprising linear heptene, as well as ethylene, some $C_4$ to $C_6$ hydrocarbons, and some $C_8$ and heavier olefins is passed through pipe 34 into separator 36. $C_4$ to $C_6$ olefins are recycled to olefin reactor 33 through pipe 37. Linear heptene is recovered throuhg pipe 38.

Ethylene from separator 24 is passed through pipe 41, ethylene from separator 36 through pipe 42, $C_8$ and heavier olefins from separator 24 through pipe 43, $C_8$ and heavier olefins from separator 36 through pipe 44, any make-up ethylene through pipe 45, and $C_6$ and heavier olefins from separator 17 through pipe 46, are passed through pipe 47 and pipe 48 into a third olefin reactor 49. The effluent from reactor 49, comprising $C_3$ to $C_5$ olefins, as well as unreacted olefins, is passed through pipe 51 to separator 52. Ethylene through pipe 53 and $C_5$ and heavier olefins through pipe 54 are returned to reactor 49. Propylene is returned to reactor 14 through pipe 55. Any propylene from separators 24 and 36 is conducted to reactor 49 together with the ethylene.

$C_3$ and $C_4$ olefins from separator 52 are passed through pipe 56 into a fourth olefin reactor 57. The effluent from reactor 57, comprising isoamylene, as well as $C_3$ and $C_4$ olefins and $C_6$ and heavier olefins, is passed through pipe 58 into separator 59. Ethylene is returned from separator 59 through pipe 61 to reactor 49. $C_3$ and $C_4$ olefins are returned through pipe 62 to reactor 57. Isoamylenes are recovered through pipe 63. $C_6$ and heavier olefins are recycled through pipe 64 to reactor 49. The combined isoamylene stream is recovered through pipe 65.

In an example of the operation of the invention, reactor 14 is operated as a batch reactor and suitable storage and transfer facilities are provided to permit the effluent to be processed through reactor 17 and for the recycle materials from separator 17 and separator 52 to be utilized. The reaction in reactor 14 is carried out at $-13°$ F., at 100 p.s.i.g. for 2 hours, using 0.007 pound bis(triphenylphosphine)dichloronickel, 0.004 pound ethylaluminumdichloride and 0.22 pound chlorobenzene diluent per pound of olefin feed.

The remainder of the operation of the example is in accordance with the invention as illustrated in the drawing and is operated continuously. In olefin reactor 22, the catalyst is a mixture of 3 parts by weight of magnesium oxide to 1 part by weight of a tungsten on silica catalyst (12 weight percent $WO_3$). The temperature is 800° F., the pressure is 200 p.s.i.g. and the weight hourly space velocity, pounds reactant per pound of catalyst per hour (WHSV) is 200.

In reactor 33, the catalyst and conditions are the same as in reactor 22.

In reactor 49, the catalyst is a mixture of 7 parts by weight of magnesium oxide to 1 part by weight of a tungsten on silica catalyst (8 weight percent $WO_3$). The temperature is 725° F., the pressure is 375 p.s.i.g. and the rate is 50 WHSV. (Based on $WO_3/SiO_2$.) In reactor 57, the catalyst is tungsten oxide on silica (8 weight percent $WO_3$), the temperature is 800° F., the pressure is 300 p.s.i.g. and the rate is 50 WHSV.

In the table are presented the number of pounds of various of the important feeds and products based on 1,000 pounds of ethylene feed, with intermediate products and unconverted feeds recycled to extinction.

TABLE

| Stream: | Hydrocarbon | Pounds |
| --- | --- | --- |
| 11 | $C_2H_4$ | 943 |
| 12 | $C_3H_6$ | 12 |
| 19 | $n-C_4H_8$ | 651 |
| 27 | $n-C_7H_{14}$ | 455 |
| 28 | $C_5H_{10}$ | 394 |
| 30 | $i-C_5H_{10}$ | 48 |
| 31 | $n-C_5H_{10}$ | 346 |
| 38 | $n-C_7H_{14}$ | 291 |
| 41 | $C_2H_4$ | 195 |
| 42 | $C_2H_4$ | 56 |
| 45 | $C_2H_4$ | 57 |
| 46 | $C_6+$ | 179 |
| 55 | $C_3H_6$ | 495 |
| 56 | $i-C_4H_8$ | 174 |
| 61 | $C_2$ | 87 |
| 56 | $C_3H_6$ | 131 |
| 63 | $i-C_5H_{10}$ | 218 |
| 65 | $i-C_5H_{10}$ | 266 |

In the practice of the invention, although there are no significant by-products, a small amount of paraffinic materials can be formed and these can be removed at any convenient point in the process, together with any paraffinic materials included in the feed stock. It is also sometimes advantageous to feed to the olefin reaction zone the feed streams which have been deoiled, that is, which have had any materials heavier than the feed removed, for example, by distillation. In this way, the accumulation or carry-over of small amounts of materials which may poison or shorten the life of the catalyst is avoided.

The isoamylenes recovered from reactor 57 and separator 59 will contain a small amount of normal amylenes. Nevertheless, the isoamylenes product of the invention is entirely suitable for dehydrogenation to isoprene.

The illustrations of the invention in the drawing and the description of the specification are, of course, simplified. Many elements required in commercial operations have been eliminated, including, for example, valves, controls, etc. Any suitable separation apparatus including larger or smaller numbers of separation vessels, different types of separation, etc., can be included within the separation zones.

In the example shown, the invention process uses, as feed materials, a comparatively large quantity of ethylene together with a comparatively small quantity of propylene. By adjustment of reaction conditions and separation procedures, the process can operate with ethylene only as the feed stock, the required amount of propylene for the co-dimerization zone being generated in other catalytic zones.

I claim:
1. A process for converting ethylene and propylene, comprising the steps of:
converting in a dimerization zone a mixed stream comprising ethylene and propylene in the presence of a catalyst system active for the codimerization of ethylene and propylene for the production of a product comprising substantial amounts of linear butenes and pentenes, to produce n-butene, n-amylene, isoamylene and branched hexene;
separating the effluent from said dimerization zone to produce a first separated stream comprising branched hexene, a second separated stream comprising n-butene and a third separated stream comprising n-amylene;
converting said branched hexene in a first olefin reaction zone by reaction with ethylene according to the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinc double bond, to produce additional isoamylene;
converting said n-butene in a second olefin reaction zone according to the olefin reaction to produce a linear olefin hydrocarbon having at least 7 carbon atoms per molecule; and
converting said n-amylene in a third olefin reaction zone according to the olefin reaction to produce a linear olefin hydrocarbon having at least 7 carbon atoms per molecule.

2. The process of claim 1 wherein:
said normal butene is reacted in said second olefin reactor to produce a substantial quantity of linear heptene;
said normal amylene is reacted in said third olefin reactor to produce a substantial quantity of linear heptene;
said branched hexene is reacted in said first olefin reactor in the presence of ethylene to produce propylene and isobutene; and
said propylene and said isobutene are reacted in a fourth olefin reactor to produce an additional quantity of isoamylene.

3. The process of claim 2 wherein
the effluent from said dimerization zone is separated in a first separation zone to produce said first separated stream comprising hexene, said second separated stream comprising butenes, said third separated stream comprising amylenes, and a fourth separated stream comprising propylene;

said first separated stream is fed to said first olefin reaction zone;

said second separated stream is fed into said second olefin reaction zone:

said third separated stream is fed to said third olefin reaction zone;

said fourth separated stream is returned to said dimerization zone;

the effluent from said second olefin reaction zone is fed into a second separation zone and separated therein to produce a fifth separated stream comprising ethylene, a sixth separated stream comprising $C_4$-$C_6$ olefins, a seventh separated stream comprising linear heptenes, and an eighth separated stream comprising $C_8$ and heavier olefins;

said fifth and eighth separated streams are fed to said first olefin reaction zone and said sixth separated stream is fed to said second olefin reaction zone;

said third separated stream is further separated to produce a ninth separated stream comprising normal amylene and a tenth separated stream comprising isoamylene;

said ninth separated stream is fed to said third olefin reaction zone;

the effluent from said third olefin reaction zone is fed to a third separation zone and separated therein to produce an eleventh separated stream comprising ethylene, a twelfth separated stream comprising $C_4$-$C_6$ olefins, a thirteenth separated stream comprising linear heptene, and a fourteenth separated stream comprising $C_8$ and heavier olefins;

said eleventh and fourteenth separated streams are fed to said first olefin reaction zone;

said twelfth separated stream is returned to said third olefin reaction zone;

the effluent from said first olefin reaction zone is fed to a fourth separation zone and separated therein to produce a fifteenth separated stream comprising ethylene, a sixteenth separated stream comprising propylene, a seventeenth separated stream comprising propylene and butene, and an eighteenth separated stream comprising $C_5$ and heavier olefins;

said fifteenth and eighteenth separated streams are fed to said first olefin reaction zone;

said sixteenth separated stream is fed to said dimerization reactor;

said seventeenth separated stream is fed to said fourth olefin reaction zone;

the effluent from said furth olefin reaction zone is fed to a fifth separation zone and separated therein to produce a nineteenth separated stream comprising ethylene, a twentieth separated stream comprising propylene and butene, a twenty-first separated stream comprising amylenes and a twenty-second separated stream comprising $C_6$ and heavier olefins;

said nineteenth and twenty-second streams are fed to said first olefin reaction zone; and said twentieth separated stream is returned to said fourth olefin reaction zone.

4. The process of claim 1 wherein said catalyst system active for the co-dimerization of ethylene and propylene is a homogeneous transition metal-containing catalyst system.

5. The process of claim 2 wherein said catalyst system active for the co-dimerization of ethylene and propylene is a homogeneous transition metal-containing catalyst system.

6. The process of claim 3 wherein said catalyst system active for the co-dimerization of ethylene and propylene is a homogeneous transition metal-containing catalyst system.

7. The process of claim 2 wherein:

propylene from the effluent from said dimerization zone is fed to said dimerization zone, and isoamylene therefrom is produced as a product of the process;

the effluent from said second olefin reactor is separated, ethylene therefrom is fed to said first olefin reactor, butenes therefrom are fed to said second olefin reactor, octenes therefrom are fed to said first olefin reactor and linear heptenes therefrom are produced as a product of the process;

the effluent from said third olefin reactor is separated, ethylene and octenes therefrom are fed to said first olefin reactor, $C_4$-$C_6$ olefins therefrom are fed to said third olefin reactor and linear heptenes therefrom are produced as a product of the process;

the effluent from said first olefin reactor is separated, ethylene and $C_5$ and heavier olefins are fed to said first olefin reactor, propylene is fed to said dimerization zone and butene is fed to said fourth olefin reactor;

the effluent from said fourth olefin reactor is separated, ethylene and $C_6$ and heavier olefins are fed to said first olefin reactor, propylene and butene are fed to said fourth olefin reactor and isoamylene is produced as a product of the process.

References Cited

UNITED STATES PATENTS

| | | | |
|---|---|---|---|
| 3,261,879 | 7/1966 | Banks | 260—683 |
| 3,379,706 | 4/1968 | Wilke | 260—683.15 |
| 3,432,572 | 3/1969 | Tazuma et al. | 260—683.15 |
| 3,457,320 | 7/1969 | Stapp et al. | 260—683 |

DELBERT E. GANTZ, Primary Examiner

C. E. SPRESSER, JR., Assistant Examiner

U.S. Cl. X.R.

260—683.15